United States Patent
Haesendonckx et al.

(10) Patent No.: US 8,354,054 B2
(45) Date of Patent: Jan. 15, 2013

(54) METHOD AND DEVICE FOR BLOW-MOLDING CONTAINERS

(75) Inventors: Frank Haesendonckx, Hamburg (DE); Jens-Peter Rasch, Ahrensburg (DE); Matthias Gernhuber, Hamburg (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 0 days.

(21) Appl. No.: 12/308,821

(22) PCT Filed: Jul. 5, 2007

(86) PCT No.: PCT/DE2007/001220
§ 371 (c)(1),
(2), (4) Date: Dec. 24, 2008

(87) PCT Pub. No.: WO2008/006347
PCT Pub. Date: Jan. 17, 2008

(65) Prior Publication Data
US 2009/0278288 A1    Nov. 12, 2009

(30) Foreign Application Priority Data
Jul. 12, 2006    (DE) .......................... 10 2006 032 140

(51) Int. Cl.
*B29C 49/64* (2006.01)
(52) U.S. Cl. ........................ 264/528; 264/532; 264/40.6
(58) Field of Classification Search .................. None
See application file for complete search history.

(56) References Cited

U.S. PATENT DOCUMENTS

| | | | |
|---|---|---|---|
| 4,473,515 A | 9/1984 | Ryder | |
| 5,182,122 A | 1/1993 | Uehara et al. | |
| 7,331,778 B2 * | 2/2008 | Uphoff et al. | 425/526 |
| 2004/0155386 A1 | 8/2004 | Gonda et al. | |

FOREIGN PATENT DOCUMENTS

| | | |
|---|---|---|
| DE | 23 52 926 | 4/1975 |
| DE | 28 14 952 | 10/1978 |
| DE | 37 29 166 | 4/1988 |
| DE | 34 08 740 | 4/1991 |
| DE | 42 12 583 | 10/1993 |
| DE | 199 06 438 | 8/2000 |
| DE | 100 27 924 | 12/2001 |
| DE | 1 314 535 | 5/2003 |
| DE | 101 45 579 | 7/2003 |
| DE | 102004003939 | 8/2005 |
| EP | 0 559 103 | 9/1993 |
| EP | 1 688 234 | 8/2006 |
| FR | 2 405 809 | 5/1979 |
| JP | 56013141 | 2/1981 |
| JP | 1127313 | 5/1989 |

(Continued)

*Primary Examiner* — Monica A Huson
(74) *Attorney, Agent, or Firm* — Lucas & Mercanti, LLP; Klaus P. Stoffel

(57) ABSTRACT

The invention relates to a method and a device for blow-molding containers. Following a thermal conditioning process, a parison is stretched by a horizontal bar inside a blow station provided with a blow mold, and is molded into a container by the effect of the blowing pressure. In order to carry out the blow-molding, pressurized gas is introduced into the container. The horizontal rod is hollow at least in parts. Once a maximum blowing pressure has been reached in the blow station and at the earliest at the beginning of a pressure drop, a cooling gas is guided out of the horizontal bar towards the bottom of the blown container.

19 Claims, 8 Drawing Sheets

| | FOREIGN PATENT DOCUMENTS | | |
|---|---|---|---|
| JP | 2289328 | 11/1990 | |
| JP | 5237923 | 9/1993 | |
| JP | 2000343590 | 12/2000 | |
| JP | 201088202 | 4/2001 | |
| JP | 2002072929 | 3/2002 | |
| WO | 2005/023517 | 3/2005 | |
| WO | 2005/023520 | 3/2005 | |

* cited by examiner

METHOD AND DEVICE FOR BLOW-MOLDING CONTAINERS

The invention concerns a method for blow molding containers, in which a preform is thermally conditioned, stretched by a stretch rod inside a blowing station equipped with a blow mold, and shaped into the container by the action of blowing pressure, and in which pressurized gas is fed into the container.

The invention also concerns a device for blow molding containers, which has at least one blowing station with a blow mold and at least one stretch rod, and in which the blowing station is connected to a supply system for supplying pressurized gas, and in which at least certain portions of the stretch rod are hollow.

In container molding by the action of blowing pressure, preforms made of thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are grippers for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

DE-OS 101 45 579 provides a detailed description of a stretching system of a blowing station with an associated stretch rod. The stretch rod is designed here as a solid rod, and the blowing air is fed to the blow mold through a connecting piston that has a larger inside diameter than the outside diameter of the stretch rod. This produces an annular gap between the stretch rod and an inner surface of the connecting piston, through which the pressurized gas can flow.

The use of a hollow stretch rod is described, for example, in DE-OS 28 14 952. A connection for the pressurized gas is created in this case by an end of the tubularly shaped stretch rod that faces away from a stretch rod tip. The supplying of pressurized gas through the end of a hollow stretch rod is also described in DE-OS 34 08 740 C2.

The previously known compressed gas supply systems have not yet been able simultaneously to meet all of the requirements that are being placed on them by continually increasing production rates. In accordance with the prior art, compressed gas has been supplied until now mainly in such a way that either the entire amount of compressed gas required for the expansion of the preform is supplied through an annular gap that surrounds the stretch rod or, when hollow stretch rods are used, through the stretch rod and from a large number of outlets distributed along the stretch rod. The use of both an annular gap and a hollow stretch rod is described in WO 2005/023517 and WO 2005/023520.

The objective of the present invention is to specify a method of the aforementioned type, by which the process time for molding the containers is reduced.

In accordance with the invention, this objective is achieved in such a way that after a maximum blowing pressure has been reached in the blowing system and at the earliest at the start of a pressure drop, a cooling gas is conducted out of the stretch rod in the direction of the base of the blow-molded container.

A further objective of the present invention is to design a device of the aforementioned type in such a way that increased productivity can be achieved per blowing station used.

In accordance with the invention, this objective is achieved by virtue of the fact that a hollow space provided in the stretch rod is designed as a temporary reservoir for blowing gas that flows into the hollow space and, after a drop in blowing pressure, is transferred out of the hollow space and into the interior space of the blow mold.

Starting active cooling of the base of the blow-molded container at the earliest at the start of a pressure drop means that cooling of the base of the container does not take place until after the contour of the container has been completely formed. The blowing pressure is maintained at full level until the solidification of the base region of the blow-molded container has progressed to the point that reshrinking no longer occurs to any appreciable extent when the pressure drops. The active cooling of the base by the gas flowing from the stretch rod makes it possible to remove the container from the blow mold relatively quickly, since further support of the container by the blow mold is no longer required. In an optimum design of the method of the invention, the pressure reduction inside the blow-molded container thus occurs at the earliest possible time, and the further hardening of the container material is promoted by blowing cooling air against it.

By using the hollow space inside the stretch rod as a temporary reservoir for the cooling air, it is possible to dispense with an external supply of additional cooling air, or it is at least possible to minimize the required amount of additional cooling gas supply. Since the blowing pressure expands in the entire interior space of the blow mold or the interior space of the blow-molded container, a corresponding pressure rise also occurs in the interior space of the stretch rod through connecting holes. When the blowing pressure drops, this blowing gas flows out of the stretch rod into the interior of the container, and a suitable orientation of the discharge ports makes it possible to convey the gas in the direction of the regions of the container that are to be cooled, especially in the direction of the base of the container.

Cooling of the container material is desirable in those regions of the container in which the preform has already at least approximately assumed the final shape of the container. However, cooling of the container is undesirable in those regions in which considerable deformation of the material is still is still necessary.

In one variant of the invention, it is proposed that the blowing air first be introduced into the interior space of the blow mold and that it then flow out of the interior space of the blow mold and into the hollow space of the stretch rod. Following the drop in blowing pressure, the blowing air then flows back into the interior of the blow mold. However, when blowing air is introduced into the blow mold through the stretch rod, it is also possible that simultaneously with the filling of the interior of the blow mold or the interior of the preform that is to be expanded into a container, the temporary reservoir of the stretch rod is also filled and that following a drop in blowing pressure, the blowing gas stored in this reservoir flows back into the interior space of the blow mold, where it produces the desired cooling effect.

A stronger cooling effect is promoted by supplying the cooling gas to the stretch rod from a compressed gas source.

To avoid the need for additional cooling gas supplies, it is proposed that the cooling gas be supplied to the stretch rod from a high-pressure blowing gas source.

It is conducive to a compact design if the cooling gas flows out of a reservoir in the stretch rod.

An extremely simple design can be realized if the reservoir of the stretch rod is filled with blowing gas from an interior space of the blow mold.

To increase the available volume of cooling gas, it is proposed that an interior space of the stretch rod be coupled with an auxiliary reservoir for cooling gas.

If the auxiliary reservoir and the interior space of the stretch rod are positioned one after the other in an essentially longitudinal direction, this also contributes to the realization of a simple design.

A large cooling gas volume together with a compact design can be provided by positioning the auxiliary reservoir in such a way that it at least partly surrounds the interior space of the stretch rod.

Further shortening of the process time is realized by molding the container in a blow mold at a blow mold temperature of no more than 60° C. or, alternatively, no more than 75° C.

In particular, it is contemplated that the container be molded in a blow mold at a blow mold temperature of no more than 40° C.

A design that is both inexpensive and extremely effective can be realized if at least a portion of the cooling gas flowing out of the stretch rod was introduced into the blow mold as blowing gas in a previous process step.

Specific embodiments of the invention are schematically illustrated in the drawings.

Figure 1:
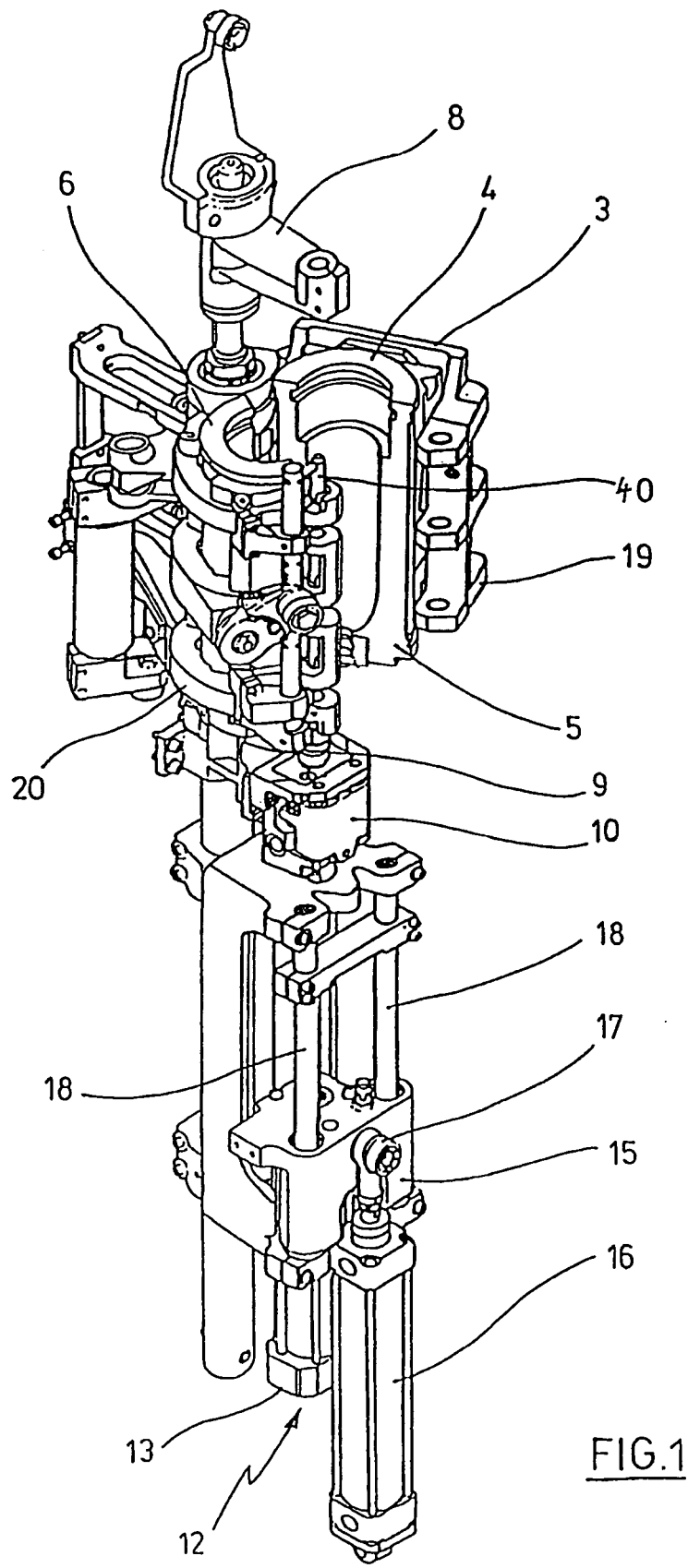
FIG. 1 shows a perspective view of a blowing station for producing containers from preforms.
Figure 2:
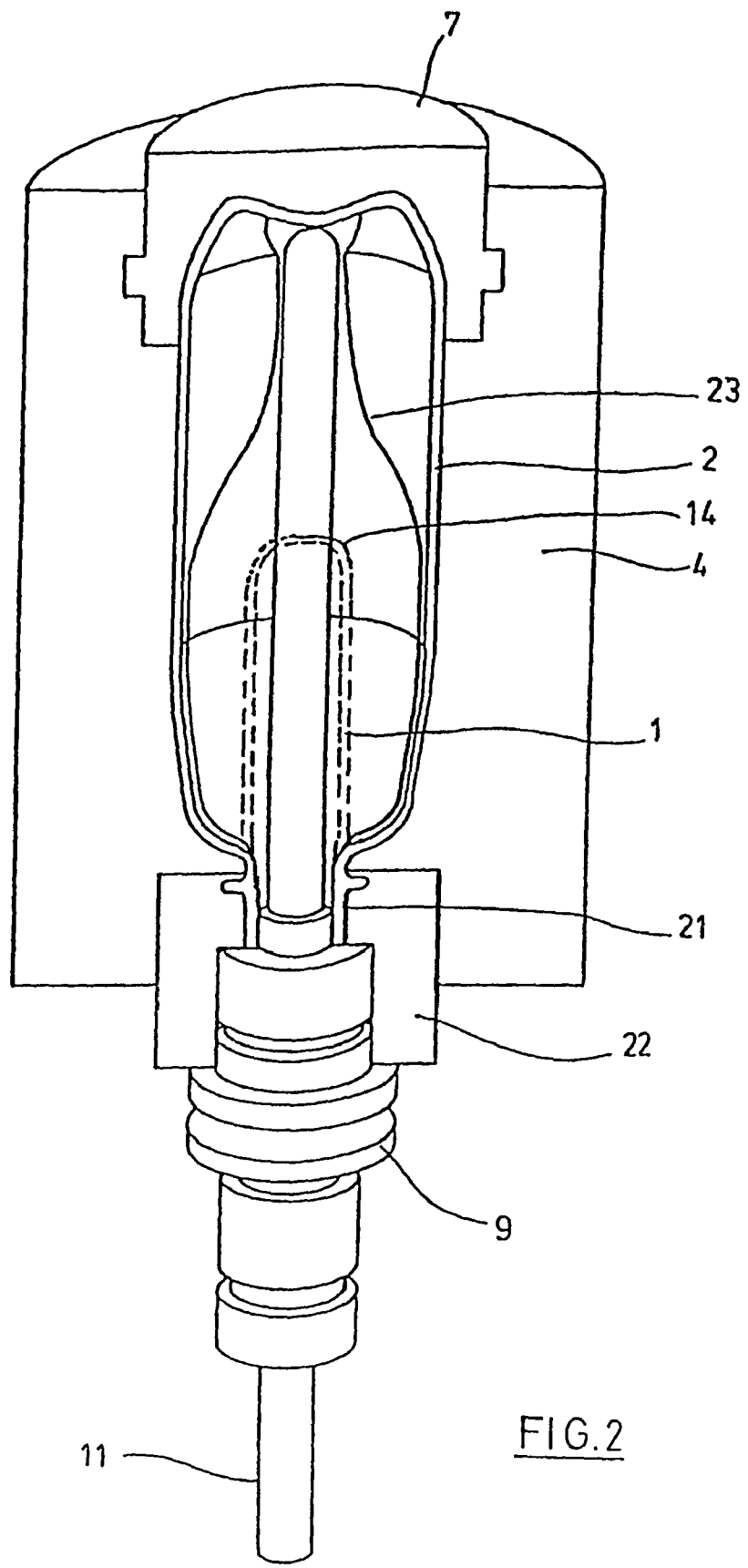
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a plurality of treatment stations within the device. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
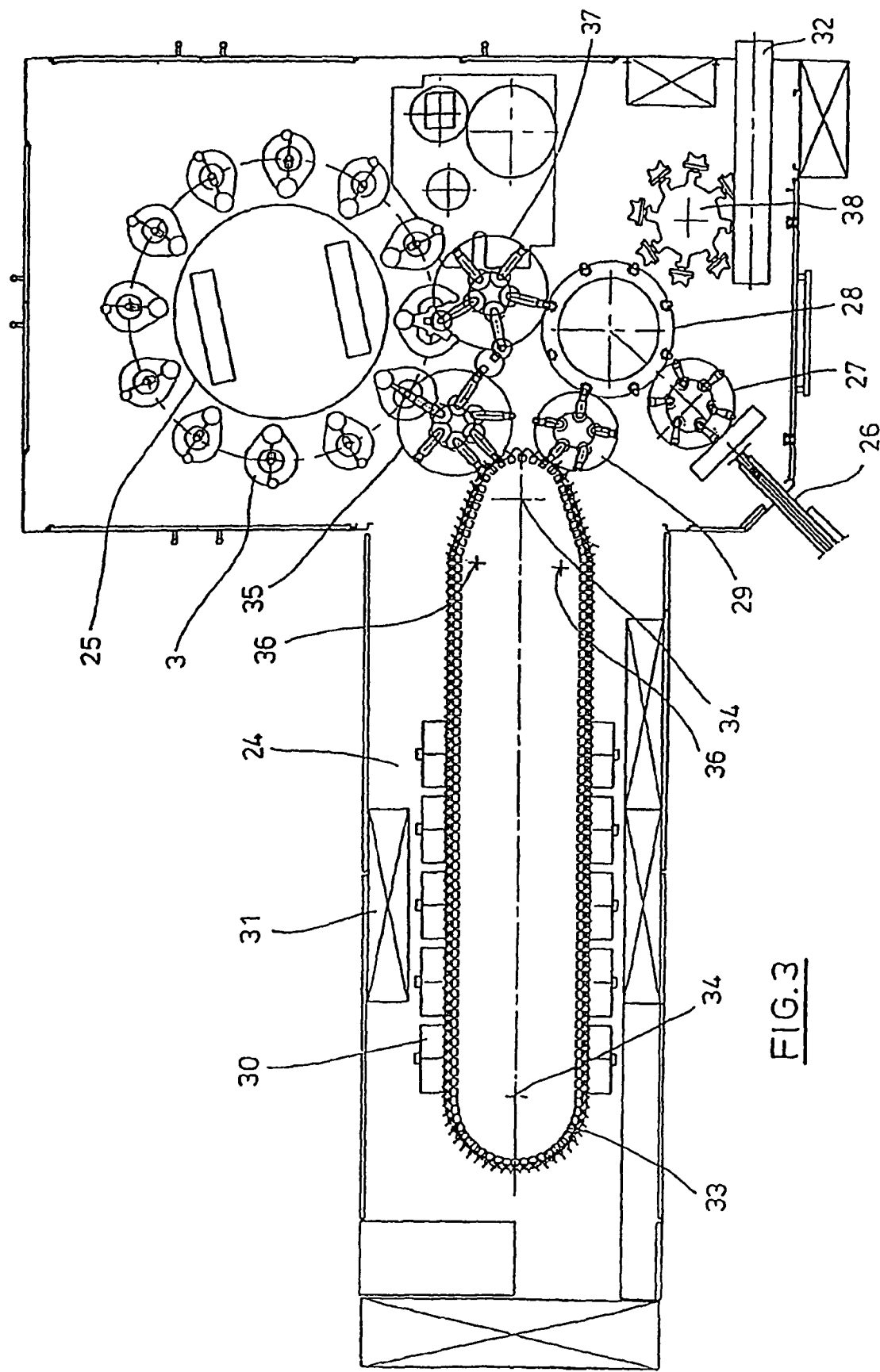
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be formed into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material, for example, PET, PEN or PP.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
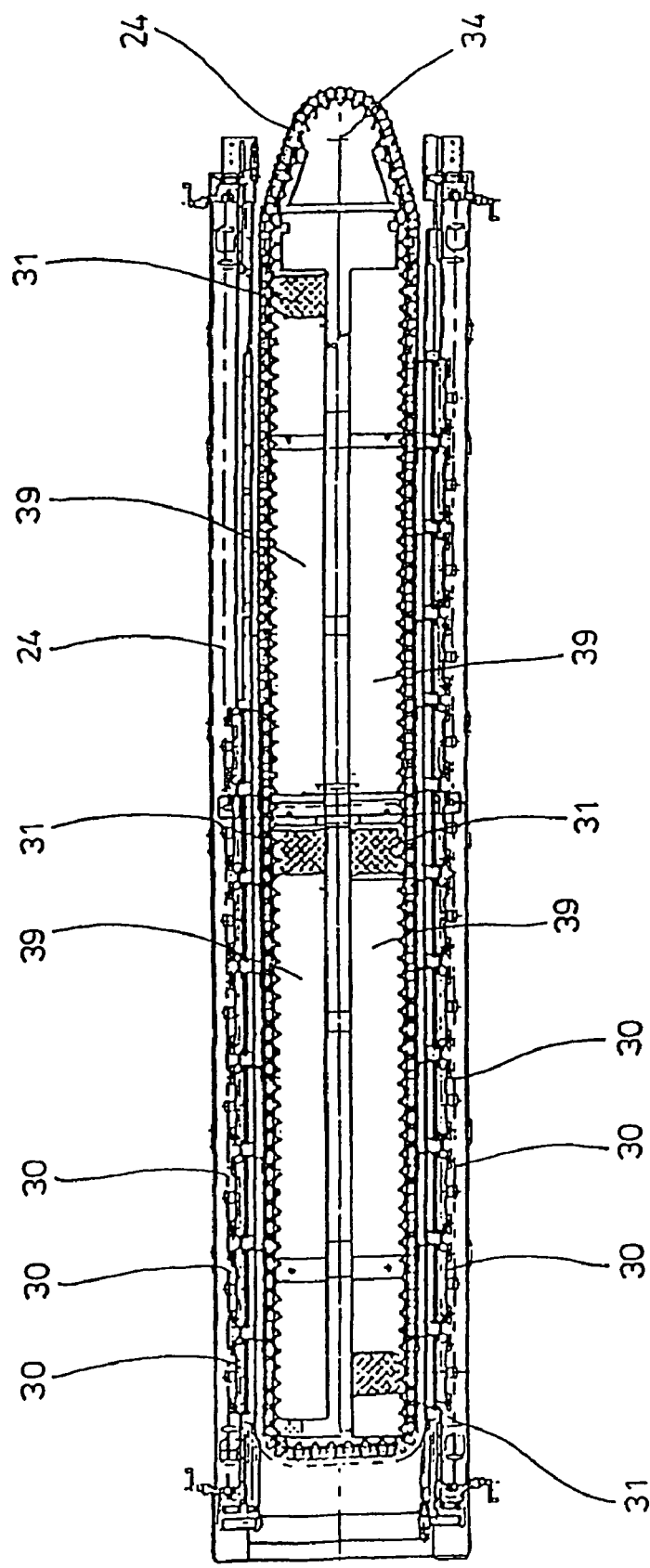
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
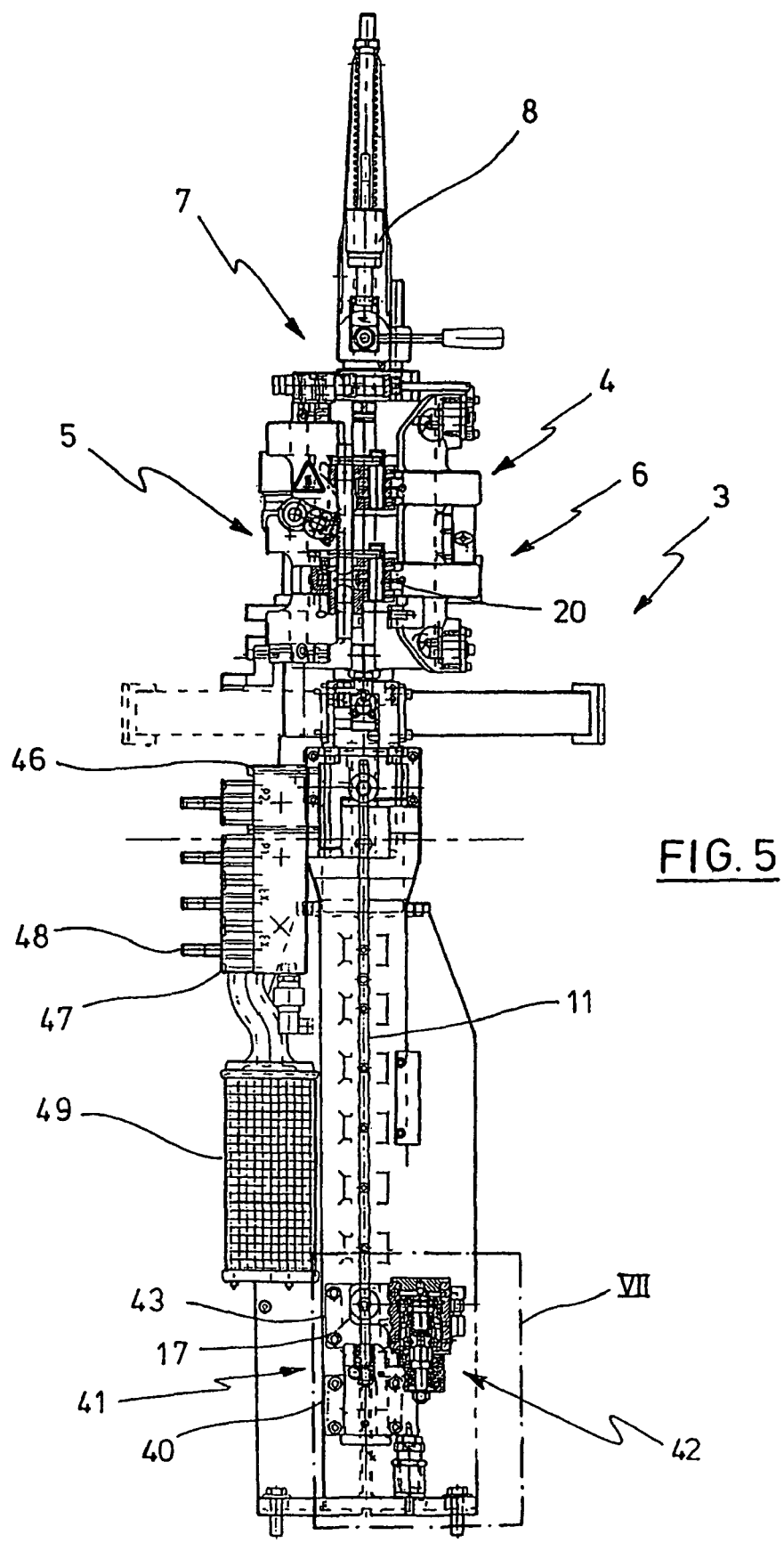
FIG. 5 shows a side view of a blowing station, in which a stretch rod is positioned by a stretch rod carrier.

FIG. 5 shows a view of the blowing station 3 that is modified relative to FIG. 1, with a direction of viewing from the front. In particular, this view shows that the stretch rod 11 is supported by a stretch rod carrier 41, which consists of a carrier base 40 and a roller carrier 43, which is connected with the carrier base 40 by a coupling element 42. The roller carrier 43 supports the guide roller 17, which serves to position the stretching system. The guide roller 17 moves along a cam track (not shown). Complete mechanical control of the stretching process is realized here.

The coupling element 42 illustrated in FIG. 5 can also be used in the embodiment of FIG. 1 to allow complete mechanical decoupling of the cylinders 12 from each other or from a supporting member for the guide roller 17.

FIG. 5 illustrates an engaged state of the coupling element 42, in which the carrier base 40 and the roller carrier 43 are connected with each other by the coupling element 42. This results in a rigid mechanical coupling, which causes positioning of the guide roller 17 to be directly and immediately converted to positioning of the stretch rod 11. As a result, exactly predetermined positioning of the stretch rod 11 is present in every state of motion of the blowing wheel 25, and with a large number of blowing stations 3 arranged on the blowing wheel 25, the positioning of the stretch rod 11 is exactly reproduced in each blowing station 3. This exact mechanical presetting of the positioning of the stretch rod 11 contributes to high product quality and a high degree of uniformity of the containers 2 that are produced.

FIG. 5 also shows the arrangement of a pneumatic block 46 for supplying blowing pressure to the blowing station 3. The pneumatic block 46 is equipped with high-pressure valves 47, which can be connected by connections 48 to one or more pressure supply sources. After the containers 2 have been blow molded, blowing air to be discharged to the environment is first fed to a muffler 49 via the pneumatic block 46.

Figure 6:
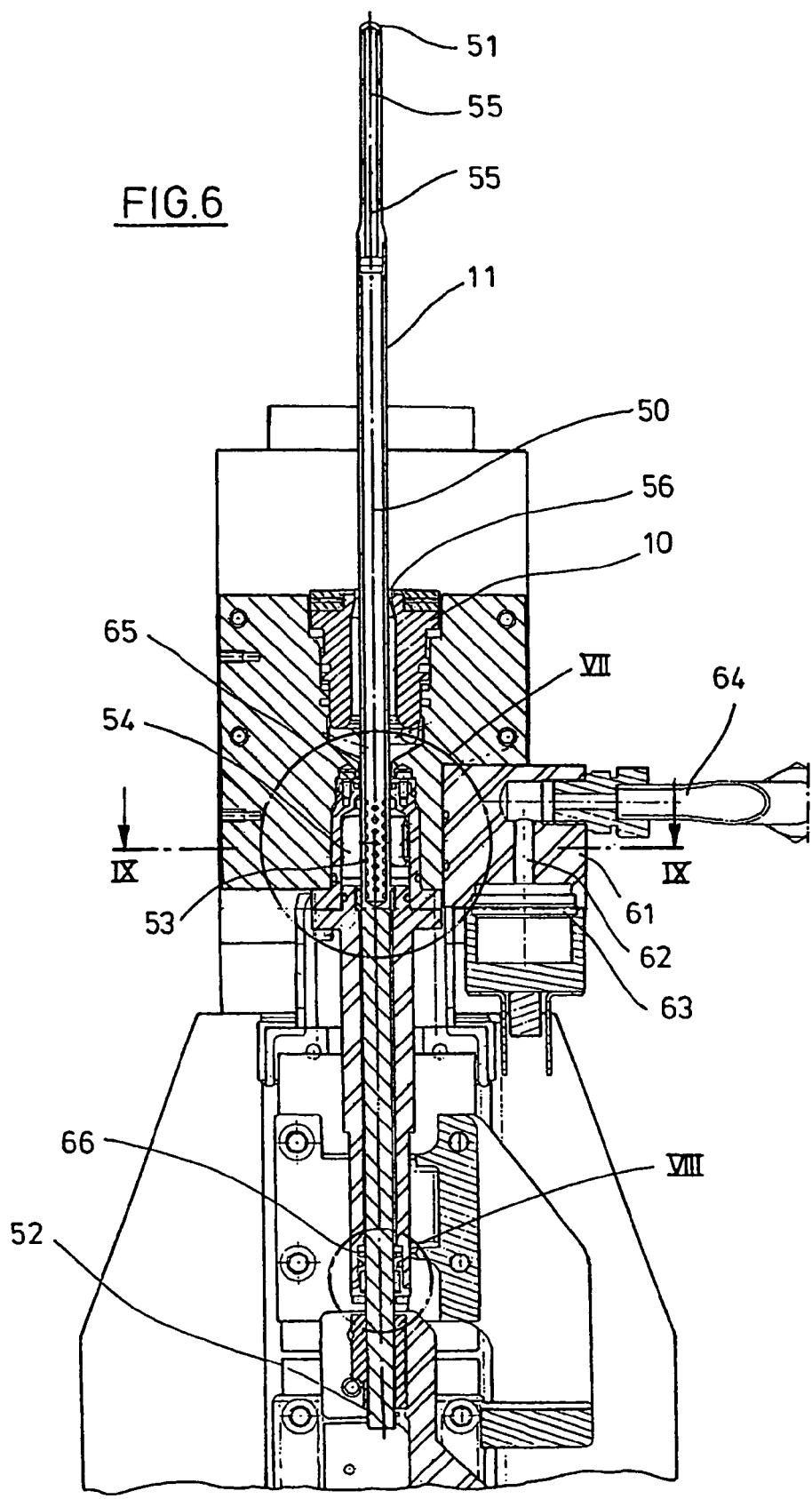
FIG. 6 shows an enlarged and partial cutaway view of an upper region of the stretch rod guide of the stretch rod.

FIG. 6 illustrates that the stretch rod 11 is provided with a rod interior 50, into which ports 53 open, which are positioned in a region located between a stretch rod tip 51 and the opposite end 52 of the stretch rod 11 from the stretch rod tip 51. In the positioning of the stretch rod 10 illustrated in FIG. 6, the ports 53 constitute a connection between the rod interior 50 and a pressure chamber 54.

Discharge ports 55 are positioned in the region of the stretch rod 11 near the stretch rod tip 51. In the specific embodiment illustrated in FIG. 6, an annular gap 56 extends around the stretch rod 11 in the vicinity of the connecting piston 10, so that in this embodiment, pressurized gas can be supplied both through the rod interior 50 and through the annular gap 56.

An admission channel, which connects a control valve 63 with a gas supply line 64, is located in the area of a valve block 61. The gas supply to the pressure chamber 54 is controlled by the control valve 63.

Rod seals 65, 66 seal the stretch rod 11 from the environment. Inside the pressure space bounded by the rod seals 65, 66, sealed guidance of the region of the stretch rod 11 that is provided with the ports 53 is possible.

Figure 7:
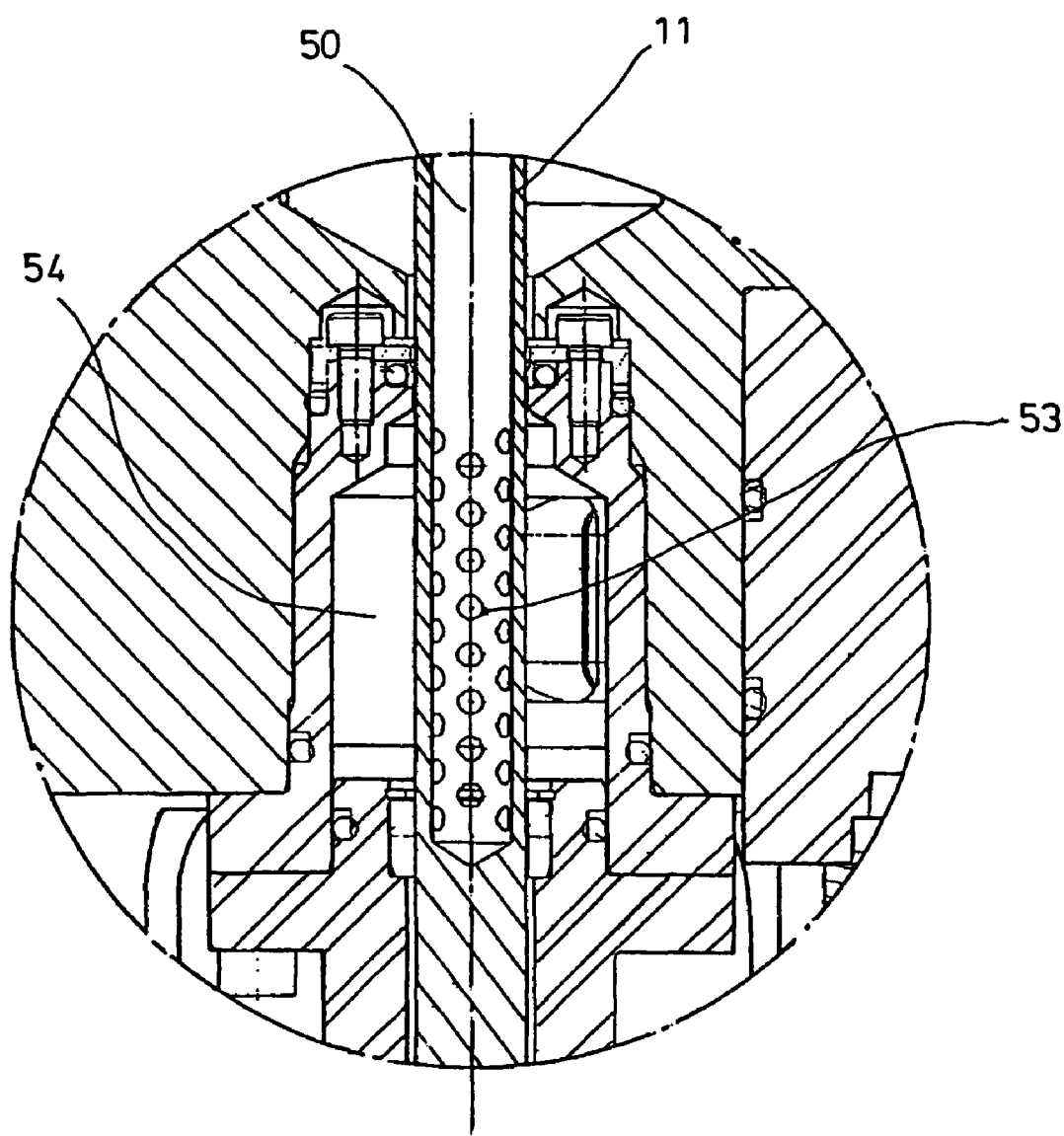
FIG. 7 shows an enlarged view of detail VII in FIG. 6.

FIG. 7 shows the structure of the stretch rod 11 in the region of the ports 53 and the design of the pressure chamber 54 in an enlarged view. In the illustrated embodiment, the ports 53 are arranged in rows in the direction of a longitudinal axis 57 of the stretch rod 11. Several rows of this type are spaced apart from one another along the circumference of the stretch rod 11. In particular, it is proposed that the rows formed in this way in the direction of the longitudinal axis 57 be arranged with relative spacing from one another in such a way that the amount of the spacing is equal to half of the distance separating the ports 53 along the center line that passes through them. In this way, each port 53 of a row of ports 53 is located at the center of a rectangular reference surface formed by two ports 53 in each of the two rows of ports on either side of the given port 53. This arrangement is conducive to uniform flow.

FIG. 8 again illustrates the arrangement of the discharge ports 55 of the stretch rod 11 in a region of the stretch rod 11 near the stretch rod tip 51 and the arrangement of the annular gap 56 in the region of the mouth section 21 of the preform 1. This arrangement makes it possible, in particular, to introduce compressed air into the preform 1 or the developing container bubble 23 through the annular gap 56 at the beginning of the blow-molding operation and then to continue the introduction of the compressed gas through the discharge ports 55 of the stretch rod 11. The discharge ports 55 are preferably arranged in a region of the stretch rod 11 close to the stretch rod tip 51, with the extent of this region in the direction of the longitudinal axis 57 being about 10 cm. A region of a maximum of 2.5 cm is preferred, and a region of a maximum of 1 cm is especially preferred. It is also possible, for example, to provide a crown of discharge ports 55 in the vicinity of the stretch rod tip 51, such that the longitudinal axis of the discharge ports extends obliquely to the base of the container 2.

Figure 8:
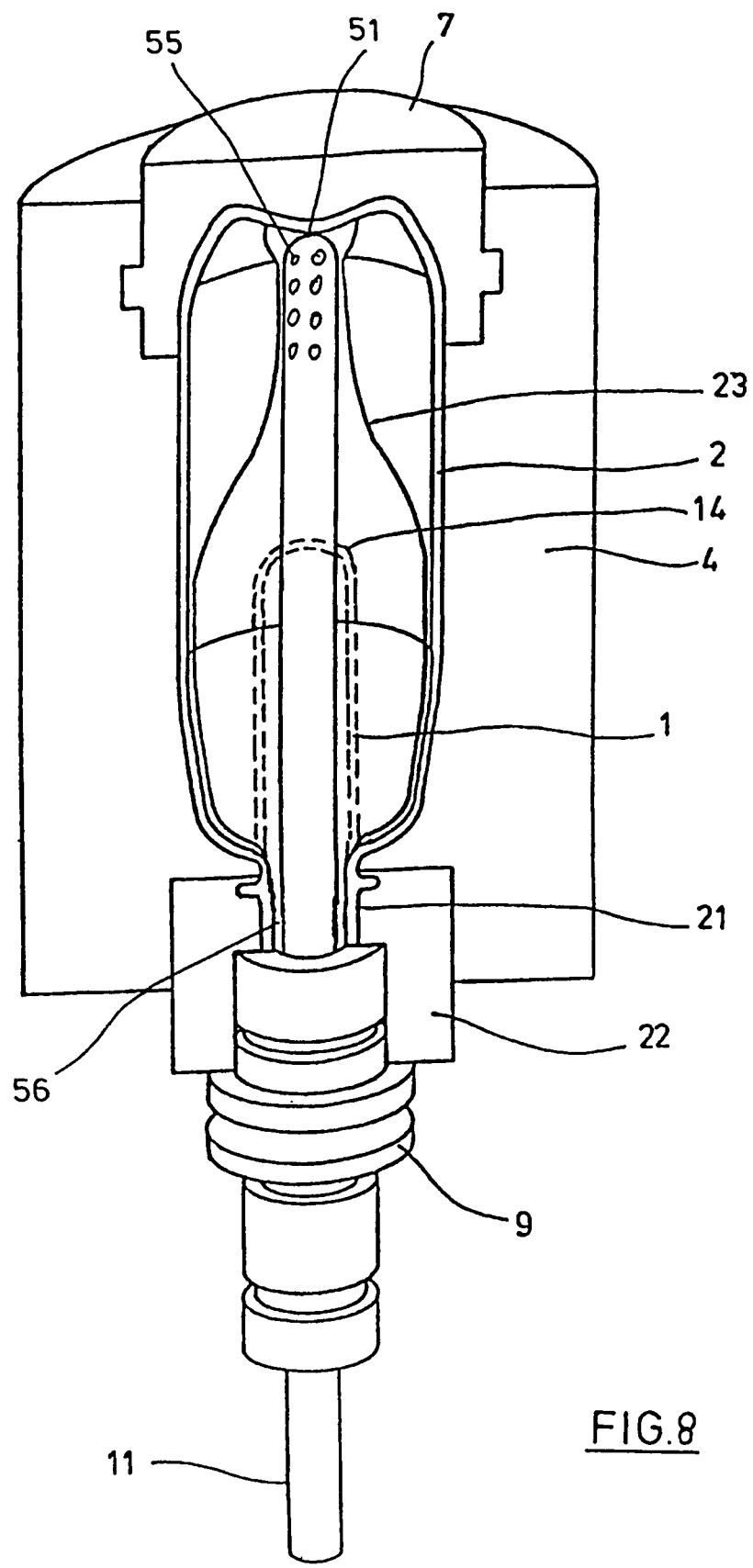
FIG. 8 shows a more detailed view, compared to FIG. 2, of a longitudinal section through the blowing station to illustrate the design of the stretch rod.

FIG. 8 illustrates that in a typical container bubble 23, the bubble already approaches or already rests against the blow mold 4 in the vicinity of the mouth section 21 in a relatively early state of formation. Depending on the geometry of the given container 2 that is to be blow molded, following the initial introduction of pressurized gas solely through the annular gap 56, the further introduction of pressurized gas can occur solely through the discharge ports 55 of the stretch rod 11. However, it is also possible to supply the pressurized gas at least temporarily through both the annular gap 56 and the discharge ports 55. It is also possible to supply all of the compressed gas through the annular gap 56.

Supplying pressurized gas simultaneously through the discharge ports 55 and the annular gap 56 makes it possible, due to the parallel connection of the flow paths, to supply pressurized gas with a lower flow resistance and thus in a smaller amount of time. Supplying pressurized gas in the second time phase of the blow-molding process solely through the discharge ports 55 promotes cooling in the area of the base of the container 2, which is formed significantly thicker than the sidewalls of the container for process-related reasons and therefore must be more intensely cooled to achieve sufficient material stability. Supplying pressurized gas solely through the annular gap 56 avoids undesired cooling effects.

In principle, it is thus possible first to supply the pressurized gas exclusively by the first flow path and then by the second flow path. However, it is also possible to supply the pressurized gas by both flow paths during the second phase of the blow-molding process or first to carry out an intermediate phase, in which pressurized gas is supplied simultaneously by both flow paths, and then a shaping phase in which pressurized gas is supplied exclusively by the second flow path.

In accordance with a preferred variant of the method, pressurized gas at a relatively low pressure level, for example, at a pressure of 5-20 bars, is supplied by the first flow path, while pressurized gas at a relatively high pressure level, for example, at a pressure of about 40 bars, is supplied by the second flow path. The lower pressure can be derived from the higher pressure by a pressure converter. In principle, it is also possible to design the cross-sectional shape of the first flow path in such a way that the first flow path is also connected to the higher pressure, and the flow resistance that is provided produces the intended pressure reduction.

In accordance with one embodiment, the method of the invention is carried out in such a way that, after the preform 1 has been inserted in the blowing station 3 and after the blow mold 4 has been closed, first an axial stretching of the preform 1 is carried out with the use of the stretch rod 11. The stretching can possibly be carried out while a first blowing pressure simultaneously acts on the preform 1.

After the stretching operation has been carried out, the preform 1 is expanded with a low blowing pressure, and then the final forming is carried out with a higher blowing pressure. The container 2 produced from the preform 1 comes to rest against the metallic blow mold 4 during this shaping process, and heat is thus transferred from the container 2 into the blow mold 4. This causes solidification of the material of the container 2.

After a maximum blowing pressure has been reached, this pressure is maintained inside the container 2 until the container 2 has reached a first stage of solidification. Although it is not yet possible to remove the container 2 from the blow mold 4 in this first state of solidification, at least no reshrinking of the container to an unacceptable extent occurs during a pressure drop.

With the start of this pressure drop or with a predetermined time delay after the start of the pressure drop, a cooling gas is conducted out of the stretch rod in the direction of the base of the blow-molded container 2. During this operation, the stretch rod 11 can be in contact with the base of the blow-molded container 2. However, it is also possible for the stretch rod to be at least partially pulled back out of the blow mold 4.

Due to the active cooling of the base region of the container 2, the container is solidified to the extent that it can be removed from the blow mold 4 relatively quickly. In this procedure, it is taken into consideration that a relatively large amount of material accumulates near the base of the container 2, so that a longer cooling time is needed than for the material in the sidewall region of the container 2.

With respect to the supplying of the cooling gas flowing out of the stretch rod 11, several design variants can be realized. In one variant, the stretch rod 11 is connected to a cooling gas supply, and the cooling gas is conducted through the stretch rod 11.

In the simplest variant, the stretch rod 11 is merely provided with a hollow space, which is filled with gas from the interior space of the container 2 during the performance of the blowing operation, in the course of which, as a result of a pressure drop inside the container 2, the gas flows back out of the stretch rod 11.

In accordance with a third embodiment, the interior space of the of the stretch rod 11 is connected to a storage volume, which increases the amount of available cooling gas. In accordance with a passive embodiment, this storage volume is also filled through the stretch rod 11 with blowing gas from the interior of the container 2 or from the interior of the blow mold 4. It is also possible to fill the corresponding storage volume from an external cooling gas source or to provide a filling by an external gas supply as well as a filling from the interior space of the blow mold 4. Suitable coordination of these operations with respect to time can be supported by actively controlled valves or, in a simple embodiment, by suitably arranged check valves.

An especially high degree of effectiveness of the method is realized if the temperature of the blow mold 4 is a maximum of 75° C. or 60° C. It has been found to be especially advantageous if the mold temperature is a maximum of 40° C. This results in the cooling effect of the container 2 resting against the blow mold 4 being superimposed on the cooling effect of the cooling gas flowing out of the stretch rod 11.

The effectiveness of the cooling effect can be significantly influenced if the stretch rod is positioned in the extended stretch position or at least near this position when the pressure release is being carried out. Control of the operation can be facilitated if the stretch rod rests against the base of the blow-molded container until the conclusion of the cooling process. In principle, however, it is also possible to pull the stretch rod back slightly before or during the cooling process.

Regardless of whether the blowing gas is supplied to the cavity of the blowing station partially or completely through the interior of the stretch rod or partially or completely through an annular gap surrounding the stretch rod or through other types of supply channels, the first step includes at least the filling of the interior of the stretch rod with blowing gas.

The invention claimed is:

1. A method for blow molding containers, in which a preform is thermally conditioned, stretched by a stretch rod inside a blow mold, and shaped into the container by the action of blowing pressure, and in which pressurized gas is fed into the container, wherein, after a maximum blowing pressure has been reached in the blow mold (4) and with the start of a pressure drop a cooling gas is conducted out of the stretch rod (11) in the direction of the base of the blow-molded container (2), wherein pressurized blowing gas that has flowed into an interior space of the stretch rod before a cooling process and during the blow molding is used as the cooling gas, wherein the cooling gas is supplied to the stretch rod (11) from a high-pressure blowing gas source wherein the cooling gas flows out of a reservoir in the stretch rod (11), wherein the reservoir of the stretch rod (11) is filled with blowing gas from an interior space of the blow mold (4).

2. A method in accordance with claim 1, wherein the cooling gas is supplied to the stretch rod (11) from a compressed gas source.

3. A method in accordance with claim 1, wherein an interior space of the stretch rod (11) is coupled with an auxiliary reservoir for cooling gas.

4. A method in accordance with claim 3, wherein the auxiliary reservoir and the interior space of the stretch rod (11) are positioned one after the other in an essentially longitudinal direction.

5. A method in accordance with claim 3, wherein the auxiliary reservoir is positioned in such a way that it at least partly surrounds the interior space of the stretch rod (11).

6. A method in accordance with claim 1, wherein the container (2) is molded in a blow mold (4) at a blow mold temperature of no more than 75° C.

7. A method in accordance with claim 1, wherein the container (2) is molded in a blow mold (4) at a blow mold temperature of no more than 40° C.

8. A method in accordance with claim 1, wherein at least a portion of the cooling gas flowing out of the stretch rod (11) was introduced into the blow mold (4) as blowing gas in a previous process step.

9. A device for blow molding containers, which has at least one blowing station with a blow mold and at least one stretch rod, and in which the blowing station is connected to a supply system for supplying pressurized gas, and in which at least certain portions of the stretch rod are hollow, wherein an interior space (50) provided in the stretch rod (11) is designed as a temporary reservoir for blowing gas that flows from the interior of the container into the interior space (50) of the stretch rod (11) and, at a start of a drop in blowing pressure, is transferred out of the interior space (50) of the stretch rod (11) and into the interior space of the blow mold (4) in a direction of the base of the container, wherein the interior space (50) of the stretch rod (11) is connected with an auxiliary reservoir for cooling gas so that the auxiliary reservoir is filled with blowing gas prior to the cooling process and during the blow molding and so that the blowing gas flows out of the interior of the container, through the stretch rod into the auxiliary reservoir and further so that, after the start of the pressure drop, the blowing gas that has flowed into the interior space of the stretch rod before a cooling process and during the blow molding acts as a cooling gas, wherein the interior space (50) of the stretch rod (11) is coupled with a high-pressure blowing gas source, wherein the temporary reservoir of the stretch rod is in fluid communication with the interior space of the blow mold so that the temporary reservoir is filled with blowing gas from the interior space of the blow mold and the cooling gas flows out of the reservoir in the stretch rod.

10. A device in accordance with claim 9, wherein the interior space (50) of the stretch rod (11) is coupled with a compressed gas source.

11. A device in accordance with claim 9, wherein the interior space (50) of the stretch rod (11) is designed for the temporary storage of high-pressure blowing gas.

12. A device in accordance with claim 9, wherein the interior space (50) of the stretch rod (11) is connected with an interior space of the blow mold (4) by at least one discharge port (55).

13. A device in accordance with claim 9, wherein the auxiliary reservoir is positioned after the interior space (50) of the stretch rod (11) in the longitudinal direction of the stretch rod (11).

14. A device in accordance with claim 9, wherein the auxiliary reservoir at least partly surrounds the stretch rod (11).

15. A device in accordance with claim 9, wherein the blow mold (4) has a temperature of no more than 75° C.

16. A device in accordance with claim 9, wherein the blow mold (4) has a temperature of no more than 40° C.

17. A device in accordance with claim 9, wherein with respect to the direction of flow of the blowing gas, the interior space of the blow mold (4) and the interior space (50) of the stretch rod (11) are positioned one after the other in such a way that the interior space of the blow mold (4) is arranged in the direction of flow of the blowing gas between a blowing gas supply and the interior space (50) of the stretch rod (11).

18. A device in accordance with claim 9, wherein the interior space (50) of the stretch rod (11) is designed as a temporary reservoir for blowing gas that flows out of an interior space of the blow mold (4) and into the interior space (50) of the stretch rod (11) and, after a drop in blowing pressure, flows back out of the interior space (50) of the stretch rod (11) and into the interior space of the blow mold (4).

19. A device in accordance with claim 9, wherein, in a first process step, the interior space (50) of the stretch rod (11) is filled from the interior space of the blow mold (4), where, subsequently, during a pressure buildup inside the blow mold (4), the blowing air stored in the interior space (50) of the stretch rod (11) is transferred back into the interior space of the blow mold (4) at least partially by blowing air fed from a blowing gas supply into the interior space (50), and where, after the drop in blowing pressure, an additional amount of blowing gas is transferred from the interior space (50) of the stretch rod (11) into the interior space of the blow mold (4).

* * * * *